United States Patent

Muldner

[11] 4,318,248
[45] Mar. 9, 1982

[54] MAT FOR GROWING LAWNS AND OTHER VEGETATION

[75] Inventor: Lawrence C. Muldner, Saratoga, Calif.

[73] Assignee: Fisons-Western Peat Moss, Ltd., Vancouver, Canada

[21] Appl. No.: 216,071

[22] Filed: Dec. 12, 1980

[51] Int. Cl.³ .............................................. A01C 1/04
[52] U.S. Cl. ...................................................... 47/56
[58] Field of Search ........................................ 47/56, 9

[56] References Cited

U.S. PATENT DOCUMENTS 3,351,031 11/1967 Phillips et al. ............... 47/56 X
3,914,901 10/1975 Muldner .......................... 47/56
4,190,981 3/1980 Muldner .......................... 47/56

FOREIGN PATENT DOCUMENTS 2035283 6/1980 United Kingdom ............... 47/56

*Primary Examiner*—Robert E. Bagwill
*Attorney, Agent, or Firm*—Harris Zimmerman; Howard Cohen

[57] ABSTRACT

A laminated mat for growing lawns or other vegetation on soil comprises a base sheet of water-pervious, bio-degradable web material. Joined to the base sheet by an adhesive binder is a bed formed of dried gel particles, seeds, and dried compressed peat particles. Secured to the bed of seeds, gel, and peat particles is an upper laminate comprising a fibrous, porous veil which protects and retains the bed therebelow. The upper veil is water pervious to pass water therethrough to the bed of gel particles, peat particles, and seeds. The gel particles absorb up to 200 times their weight in water, facilitating wetting of the peat particles and seeds, and creating sufficient weight in the mat to resist high wind lift forces. The bio-degradable veil also easily expands to retain the web, expanded peat and gel particles and the seeds entrained thereby.

4 Claims, 6 Drawing Figures

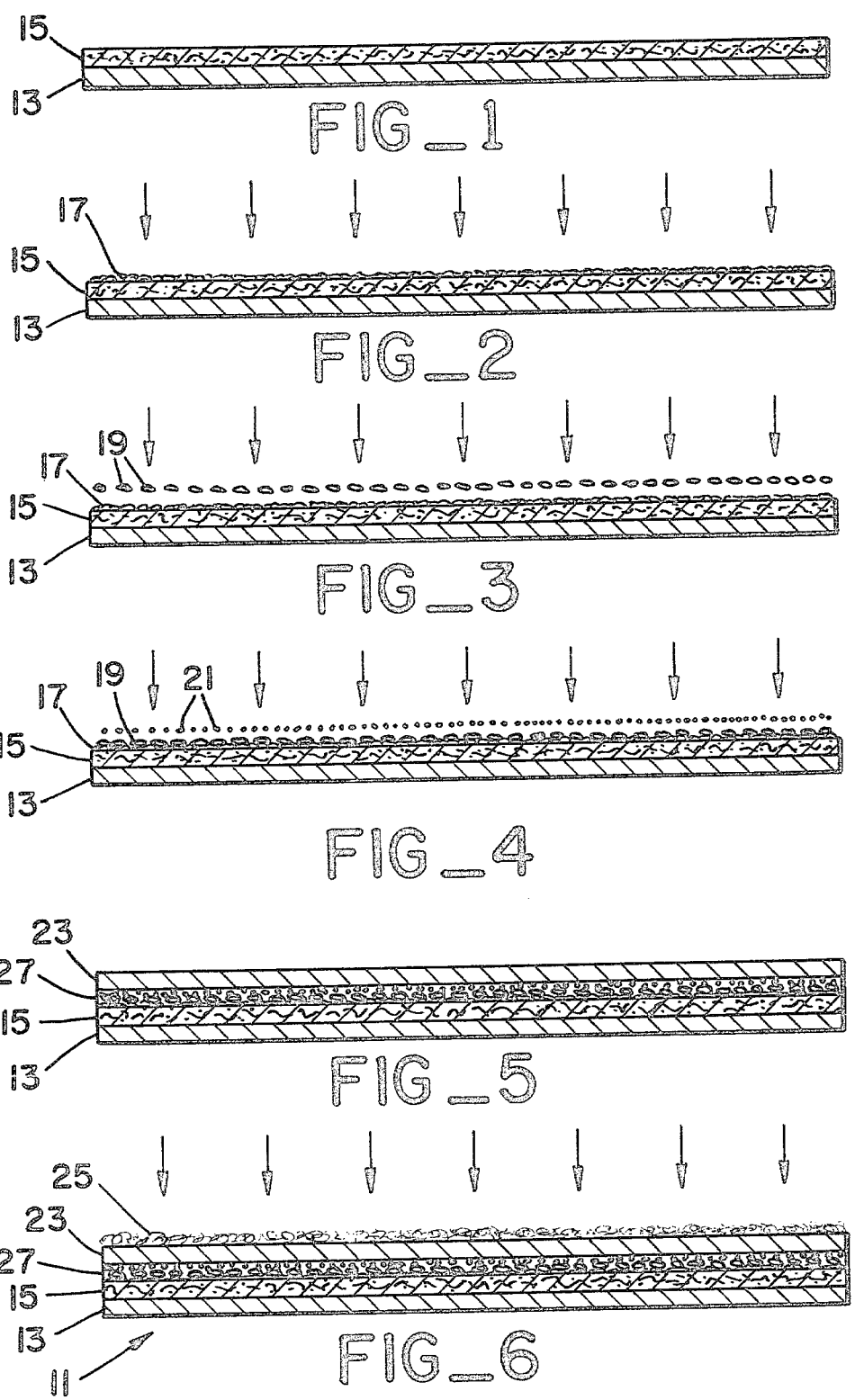

MAT FOR GROWING LAWNS AND OTHER VEGETATION

BACKGROUND OF THE INVENTION

There are known in the prior art many forms of mat or carpet products which are intended for growing lawns and other forms of vegetation. These products generally include some sort of fibrous material which provides structural integrity to the mat, and a mulch material which is often mixed with the seeds to be germinated. These products also include some form of joining these various materials together, including stitching, adhesives, and the like. Generally speaking, these products have not gained wide acceptance due to failures in some aspects of their designs.

For example, most mulch material used in these products expands upon watering. Often, the expansion of the mulch material breaks whatever bond is provided with the fibrous structural material of the mat, with the result that significant portions of the mulch and seed mixture are washed away from the mat. Stitching methods for joining the materials to form a mat tend to limit the expansion of the mulch material, forming an irregular surface and also decreasing the survival rate of the germinating seeds.

Also, many of the prior art mat products fail to protect properly the seeds during the germinating and sprouting periods. As the seeds are covered only by a thin layer of mulch material, they are prey to birds and the deleterious effects of strong sunlight. Furthermore, these products often require frequent watering to prevent dehydration of the seed and seedlings, since the water retention capacity of the thin mulch layer is low. The prior art mat products are also subject to lift forces generated by winds of at least moderate strength. Often wind pegs must be used to stake down the mat, later to be removed before mowing. The labor involved is thus duplicated in time and expense.

SUMMARY OF THE PRESENT INVENTION

The present invention generally comprises an improved mat for growing lawns or other vegetation upon soil. It is characterized by an unique construction which retains the mulch material after it is watered and expanded, and which also allows free water flow therethrough. Also, the construction of the present invention quickly absorbs a great amount of water to protect the seeds and mulch material during the vital germination and sprouting periods, and to add weight to the mat sufficient to resist lift forces on the mat caused by ambient winds.

The construction of the mat of the present invention includes a base sheet of web material which is easily degradable upon wetting, and which quickly becomes part of the underlying soil. An adhesive binder joins to the base sheet a bed of seeds mixed with dried gel granules and dried compressed peat particles. The peat particles are also prescreened to remove smaller particles and dust which interfere with the adhesion of the binder.

Joined to the top of the bed of seeds, gel granules, and peat particles by an adhesive binder is a fibrous veil comprising an unwoven, porous fabric formed of biodegradable synthetic fibers. The veil is bonded to the bed of seeds, gel granules, and peat particles to provide structural integrity to the mat after the mat has been placed on soil and watering has substantially dissolved the base sheet.

The fibrous veil serves other important functions. It protects the seeds and seedlings from direct sunlight, and also greatly ameliorates the eroding effects of wind, water, and the like. The veil is particularly characterized by its ability to expand laterally in concert with the expanding wetted gel granules and peat particles, so that the particles and seeds are well secured during the germination and sprouting phases.

After the mat is applied to a soil surface, water is applied either by irrigation or natural rainfall to rehydrate the gel granules and to initiate swelling of the peat particles. The gel granules quickly absorb approximately 200 times their weight in water, adding so much weight to the mat that high winds cannot lift it. The rehydrated gel keeps the seed bed moist, hastens the rehydration of the peat particles, and causes the base sheet quickly to dissolve. The sprouting seeds easily may send roots through the deteriorated base sheet, and may send shoots upwardly through the fibrous veil. The fibrous veil biodegrades after a period of months, after the seedlings are well established and rooted in the underlying soil.

The prior art closest to the present invention is U.S. Pat. No. 4,190,981, issued on Mar. 4, 1980 to Lawrence C. Muldner.

A BRIEF DESCRIPTION OF THE DRAWING

FIG. 1 illustrates a base sheet and an adhesive material used in forming the improved mat of the present invention.

FIG. 2 illustrates the application of dehydrated gel granules to the structure shown in FIG. 1.

FIG. 3 illustrates the application of seed to the structure shown in FIG. 2.

FIG. 4 illustrates the application of compressed, screened peat particles to the structure shown in FIG. 3.

FIG. 5 illustrates the structure of FIG. 4, after the application of adhesive material over the bed of seeds, gel granules, and compressed peat particles of the structure shown in FIG. 4.

FIG. 6 illustrates the improved mat of the present invention after the application of the fibrous veil to the structure shown in FIG. 5.

DESCRIPTION OF THE PREFERRED EMBODIMENT

The present invention generally comprises a mat-like laminated structure 11, as shown in FIG. 6, which is adapted to grow lawns or similar vegetation on a soil surface. The mat 11 includes seeds of the desired vegetation, a mulch material which provides protection for the seeds and a growth medium for the seeds, a gel substance for water retention, and structural material which maintains the integrity of the mat and protects the seeds and mulch during germination and sprouting of the seeds.

The mat 11 comprises laminated layers of selected materials which are assembled in a sequence depicted in FIGS. 1-6. As shown in FIG. 1, the fabrication of the mat 11 begins with a base sheet 13, which comprises a biodegradable material. In the preferred embodiment, the base sheet 13 is formed of light tissue paper weighing 8 to 11 pounds per three thousand square feet. The tissue paper is mechanically roughed or scarfed to increase the bonding thereto of subsequent laminations.

Also the tissue paper may be perforated to increase water flow through the mat 11.

It should be noted that the tissue paper provides substantial structural integrity to the mat 11 prior to use of the product, i.e., during manufacture, storage, and shipping. However, after the mat is in place and watered, the tissue paper base sheet 13 deteriorates rapidly, losing a substantial portion of its strength upon initial wetting.

An adhesive binding material 15 is then applied to the scarfed surface of the base sheet 13. Preferably, the adhesive binder comprises a water base rubber adhesive compound which is easily biodegradable and which provides a high tack factor. The water base adhesive loses most of its binder properties upon wetting. The adhesive material 15 is sprayed onto the base sheet by conventional techniques.

After the adhesive layer 15 is applied, a layer of dehydrated gel granules 17 is dispersed onto the adhesive. The gal granules 17 are known in the prior art, and are available commercially. One such product, sold under the tradename TERRA-SORB, is available from Industrial Services International, of Bradenton, Fla. The gel granules 17 have a consistency similar to sawdust; upon wetting, the granules will absorb approximately 200 times their dry weight in water and form a gel mass.

Next, seeds 19 of the desired kind of vegetation are dispersed upon the adhesive material 15, as shown in FIG. 3. Following this step, particles of dried, compressed peat 21 are spread in a thin layer over the adhesive binder 15, the gel granule layer 17, and the seed layer 19 to form a bed of seeds mixed with the compressed peat particles. The peat particles are formed by first drying the peat to a moisture content of 20% or less, then compressing the peat to form dense cylinders. The cylinders are then cut up and passed through a grinder or hammer mill to form particles of compressed peat. The particles are screened on $\frac{1}{8}$ inch mesh to obtain particles in the size range of 1/16th to $\frac{3}{8}$th inch. The screening step removes smaller, dust-like particles which would otherwise be absorbed by the adhesive binder and would reduce the adhesion of the laminations.

It should be noted that upon wetting, dried peat expands greatly. If the compressed peat particles are larger than the aforementioned size range, they will expand upon watering to produce an uneven and irregular upper surface. Further, dried compressed peat forms a lamination which is structurally superior to that which is formed by undried or loose peat. Also, the dried peat increases the shelf life of the mat 11, as it does not provide sufficient moisture for the germination of the seeds 19.

Another adhesive binder material layer 23 is then applied over the bed 27 of seeds, gel granules, and peat particles as shown in FIG. 5. This adhesive binder material may also comprise a water base rubber adhesive, or any other similar adhesive material.

As shown in FIG. 6, a fibrous veil of unwoven fabric having a cotton-like texture is then applied to the adhesive layer 23. The adhesive material 23 binds the fibrous veil 25 to the bed 27 of seeds, gel granules, and dried, compressed peat particles. The veil 25 serves a multitude of functions in the mat 11 of the present invention. The fibers of the mat permit water to pass therethrough, while protecting the bed from destruction from excessive water run-off or high winds. Also, the fibrous veil 25 controls evaporation of water from the seed bed so that a moist growing medium is maintained. The veil also protects the seeds from direct sun, and helps prevent severe temperature changes in the bed 21.

An important characteristic of the veil 25 is that it is easily laterally expandable. As the peat particles are wetted and caused to expand, the fibrous veil 25 expands with the particles to retain and protect the peat particles and the seeds.

In the preferred embodiment, the fibrous veil has a loft ranging between $\frac{1}{8}$th and $\frac{1}{4}$th inch, this loft being sufficient to retain the expanding peat particles within its non-woven structure. The veil is composed of biodegradable synthetic fibers having a denier of approximately $6\frac{1}{2}$, and a weight in the range of 4/10s per ounce per square yard to 8/10s per ounce per square yard. The synthetic fibers are biodegradable in a period of 12 to 18 months after planting, so that the seedlings are well established before the veil disintegrates. It may be appreciated that the germinating seedlings may easily pass through the unwoven fibers of the veil, while the roots of the germinating seedlings easily may pass through the peat particles and tissue paper to penetrate the soil therebelow.

The light absorption associated with the color of the fibers forming the fibrous veil may be very important in areas having extreme climates. In locales having hot climates and little water, the fibers may be white to reflect a substantial portion of incident sunlight and prevent the mat 11 from overheating and damaging the seeds. Conversely, in cold climates the fibers may be a dark color or black to absorb more sunlight and maintain a temperature in the mat sufficient to foster germination.

The gel granules contribute significantly to the effectiveness of the mat of the present invention. Immediately upon initial watering, the gel granules absorb so much water that the mat becomes quite heavy. The added weight provides excellent resistance to lift forces on the mat created by high winds. As a result, there is no need to stake down the mat when it is installed at a growing site. A great amount of labor is saved, especially when it is considered that any stakes or pegs must be removed before the first mowing or cutting.

Furthermore, the rehydrated gel totally wets the paper base sheet, hastening the bio-degradation of the sheet before the seeds sprout and encouraging the roots to penetrate into the underlying soil. The gel also wets the entire seed bed and maintains moisture therein, facilitating rehydration of the peat particles and keeping the seeds optimally wetted for sprouting.

The mat of the present invention is easily used to form a lawn or the like merely by unrolling the mat onto a prepared soil surface and then watering the mat. Upon watering, the gel granules rehydrate within a few minutes to form a gelatinous material. The gelatin is so heavy with absorbed water that the weight it imparts to the mat prevents high winds from lifting the mat. The gelatinous material also hastens the wetting of the peat particles and the paper base sheet. As a result, the base sheet biodegrades very quickly, and the rehydration of the peat particles is hastened significantly. The tissue paper base sheet begins to deteriorate immediately, and the dried peat particles expand to several times their dry size. The fibrous veil 25 expands with the peat particles, providing the structural strength to maintain the seed bed as an integral unit while the seeds begin to germinate. It should be noted that after the initial watering, the fibrous veil provides the primary structural strength for the mat 11, although the loft, non-woven nature, and placement of the veil above the seed bed provides this structural function without any interference with the germination and rooting of the seeds.

The finished mat 11 weighs approximately 15 to 20 pounds per one hundred square feet. This relatively light weight is due to the use of light materials and compressed, dried peat particles, and facilitates easy handling of large pieces of the mat 11 when configured in a spiral wound roll.

I claim:

1. An improved laminated mat for growing vegetation on soil, comprising,
   a lower base sheet laminate of water pervious web material, said material being quickly biodegradable upon wetting;
   a seed bed including a plurality of seeds, granules of dehydrated gel material, and dried peat particles, said granules being rehydratable substantially immediately upon wetting to form a heavy gelatinous substance which anchors said mat to the soil, wets said seeds and said peat particles, and maintains moisture in said bed, said peat particles being expandable upon wetting to surround and form a mulch for said seeds;
   means for adhesively securing said seed bed to said base sheet; and
   an upper veil laminate of fibrous, non-woven, porous web material and means for adhesively securing said veil to said seed bed, said veil comprising means for expanding with said peat particles to maintain the structural integrity of said mat after biodegradation of said base sheet, said veil being slowly biodegradable to deteriorate after germination and rooting of said seeds.

2. The laminated mat of claim 1, wherein said means for adhesively securing comprises a water base adhesive material which dissolves upon wetting.

3. The laminated mat of claim 1, wherein said base sheet is formed of a tissue paper materal.

4. The laminated mat of claim 1, wherein said dried peat particles comprise peat which has been dried, compressed, broken into particles, and screened to a predetermined particle size range.

* * * * *